(12) United States Patent
Lim et al.

(10) Patent No.: US 10,140,851 B2
(45) Date of Patent: Nov. 27, 2018

(54) METHOD AND ELECTRONIC DEVICE FOR PERFORMING CONNECTION BETWEEN ELECTRONIC DEVICES

(71) Applicant: Samsung Electronics Co., Ltd., Gyeonggi-do (KR)

(72) Inventors: Jun-Hak Lim, Gyeonggi-do (KR); Young-Jae Choi, Gyeonggi-do (KR); Hyuk Kang, Gyeonggi-do (KR); In-Ji Jin, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 228 days.

(21) Appl. No.: 15/181,757

(22) Filed: Jun. 14, 2016

(65) Prior Publication Data

US 2017/0039845 A1   Feb. 9, 2017

(30) Foreign Application Priority Data

Aug. 7, 2015  (KR) .................. 10-2015-0111750

(51) Int. Cl.
*G08C 17/02* (2006.01)
*H04L 29/08* (2006.01)
*H04W 4/50* (2018.01)
*H04W 4/38* (2018.01)
*H04W 76/10* (2018.01)
*H04W 76/11* (2018.01)
*H04W 4/04* (2009.01)

(52) U.S. Cl.
CPC .............. *G08C 17/02* (2013.01); *H04L 67/12* (2013.01); *H04W 4/38* (2018.02); *H04W 4/50* (2018.02); *H04W 76/10* (2018.02); *H04W 76/11* (2018.02); *H04W 4/046* (2013.01)

(58) Field of Classification Search
CPC .......... G08C 17/02; H04W 4/38; H04W 4/50; H04W 76/11; H04W 76/10; H04W 4/046; H04L 67/12
See application file for complete search history.

(56) References Cited

U.S. PATENT DOCUMENTS

| 9,355,559 | B1* | 5/2016 | Bowen | .................... H04L 67/16 |
| 9,786,159 | B2* | 10/2017 | Patel | ...................... G08C 17/02 |
| 2014/0059235 | A1 | 2/2014 | Palin et al. | |
| 2014/0364056 | A1* | 12/2014 | Belk | .................... H04B 5/0031 455/41.1 |
| 2015/0282132 | A1 | 10/2015 | Kim et al. | |

FOREIGN PATENT DOCUMENTS

KR   10-2015-0068392 A   6/2015

\* cited by examiner

*Primary Examiner* — Mohamed Barakat
(74) *Attorney, Agent, or Firm* — Cha & Reiter, LLC.

(57) ABSTRACT

A method of performing a connection between electronic devices and an electronic device thereof. The method may include: receiving a first signal including first information of the media device through first communication mode; generating a second signal including identification information of the media device by using at least a part of the first information in response to the first signal; transmitting the second signal to the media device through the first communication mode; and performing a connection with the media device by using the first information.

20 Claims, 14 Drawing Sheets

METHOD AND ELECTRONIC DEVICE FOR PERFORMING CONNECTION BETWEEN ELECTRONIC DEVICES

CLAIM OF PRIORITY

This application claims priority under 35 U.S.C. § 119(a) from Korean Application Serial No. 10-2015-0111750, which was filed in the Korean Intellectual Property Office on Aug. 7, 2015, the entire content of which is hereby incorporated by reference.

BACKGROUND

Field of the Disclosure

The present disclosure relates to a method and an electronic device for performing a connection between electronic devices.

Description of the Related Art

Recent electronic devices (for example, smart TVs, smart phones, tablet PCs, and wearable devices) provide various functions to users. For example, the electronic devices may share content and/or information with another electronic device through wireless communication and provide shared contents and/or information to the users as well as a function of simply providing audio and/or video contents. Further, the user may configure a driving environment suitable for each function provided by the electronic devices and receive various pieces of contents and/or information through a desired scheme according to the configured driving environment.

In order to prevent inconvenience to directly configure a driving environment for various functions provided by an electronic device, the driving environment of the electronic device can be configured through another electronic device. In this case, the electronic device requires a connection with the other electronic device to configure the driving environment. However, when the electronic device connects to the other electronic device through a simple connection request signal and response signal, security may be weak. Further, the user may have difficulty in identifying which electronic device a connection has been made with and is being used to configure the driving environment other electronic devices. Thus, there is a need for obtaining configuration information regarding a driving environment provided by an electronic device.

SUMMARY

Various embodiments of the present disclosure provide a method and an apparatus for transmitting configuration information to solve at least some of the aforementioned problems or other problems, and provide at least some of the advantages discussed herein below.

In accordance with an aspect of the present disclosure, a method of performing a connection with a media device by an electronic device may include: receiving a first signal including first information of the media device through a first communication mode; generating a second signal including identification information of the media device by using at least a part of the first information in response to the first signal; transmitting the second signal to the media device through the first communication mode; and performing a connection with the media device by using the first information.

In accordance with another aspect of the present disclosure, an electronic device for performing a connection with a media device includes: a communication module including hardware that receives a first signal including first information of the media device through first communication mode; and a processor having circuitry that generates a second signal including identification information of the media device by using at least a part of the first information in response to the first signal, controls the communication module to transmit the second signal to the media device through the first communication mode, and performs a connection with the media device by using the first information through the communication module.

In accordance with another aspect of the present disclosure, a method of performing a connection with a mobile device by an electronic device includes: transmitting a first signal including first information of the electronic device through first communication mode; receiving a second signal including identification information generated using at least a part of the first information from a mobile device having received the first signal; and when it is determined that the identification information is valid, performing a connection with the mobile device in response to the second signal.

In accordance with another aspect of the present disclosure, an electronic device for performing a connection with a mobile device, includes: a communication module including hardware that transmits a first signal including first information of the electronic device through first communication mode and receives a second signal including identification information generated using at least a part of the first information from a mobile device having received the first signal; and a processor having circuitry so that the processor performs a connection with the mobile device in response to the second signal through the communication module when it is determined that the identification information is valid.

According to various embodiments of the present disclosure, the electronic device can generate a response signal including identification information by using information regarding the media device received from the media device. Further, the electronic device can transmit the response signal including the identification information to the media device and form the connection with the media device, so as to perform a connection with enhanced security. Further, the electronic device can display progress of the configuration by the electronic device through the media device, thereby improving usability.

BRIEF DESCRIPTION OF THE DRAWINGS

The above and other exemplary aspects, features, and advantages of the present disclosure will become more apparent to a person of ordinary skill in the art from the following detailed description taken in conjunction with the accompanying drawings, in which.

DETAILED DESCRIPTION

Figure 1:
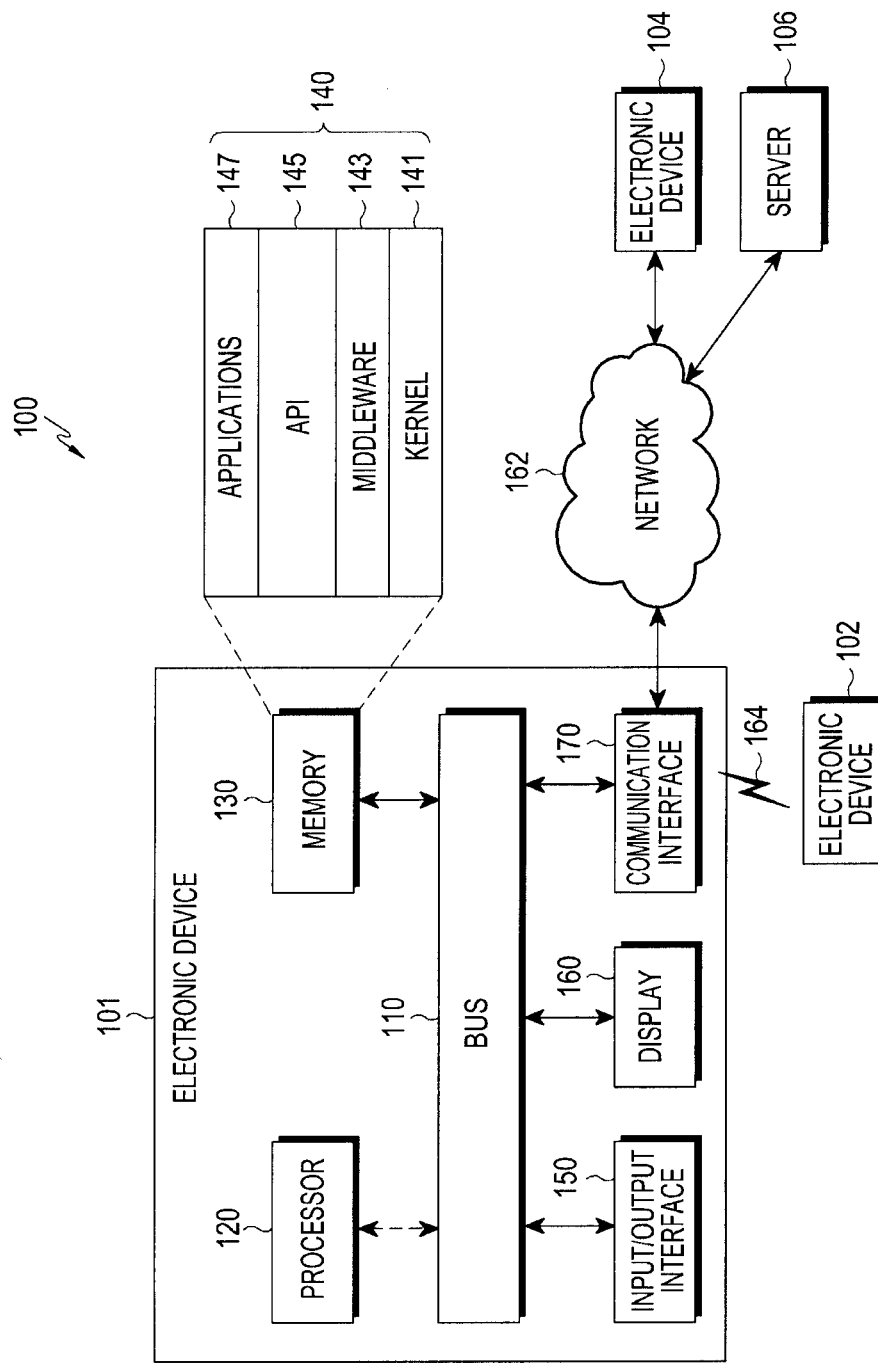
FIG. 1 illustrates a network environment including an electronic device according to various embodiments of the present disclosure.

Hereinafter, various embodiments of this document will be described with reference to the accompanying drawings. However, it should be understood that there the present disclosure and the appended claims are note limited by the particular forms disclosed herein; rather, the present disclosure should be construed to cover various modifications, equivalents, and/or alternatives of embodiments of the present disclosure. In the description of the drawings, similar reference numerals may be used to designate similar elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Terms such as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, just to mention some non-limiting examples. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be realized as a home appliance. The smart home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

An electronic device 101 within a network environment 100, according to various embodiments, will now be described with reference to FIG. 1. The electronic device 101 may include a bus 110, a processor 120, a non-transitory memory 130, an input/output interface 150, a display 160, and a communication interface 170. In some embodiments, the electronic device 101 may omit at least one of the above elements or may further include other elements.

The bus 110 may include, for example, a circuit for connecting the elements 110 to 170 and for transferring communication (for example, control messages and/or data) between the elements.

The processor 120, which includes hardware and may include one or more of a Central Processing Unit (CPU), an Application Processor (AP), and a Communication Processor (CP). For example, the processor 120 may carry out operations or data processing related to control and/or communication of at least one other element of the electronic device 101.

The non-transitory memory 130 may include a volatile memory and/or a non-volatile memory. The non-transitory memory 130 may store, for example, instructions or data related to at least one other element of the electronic device 101. According to an embodiment, the non-transitory memory 130 may store software and/or a program 140. The program 140 may include a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage, for example, system resources (for example, the bus 110, the processor 120, and the memory 130) which are used to execute an operation or a function implemented in the other programs (for example, the middleware 143, the API 145, and the application programs 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (for example, the bus 110, the processor 120, the memory 130, or the like) of the electronic device 101, to at least one of the application programs 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include, for example, at least one interface or function (for example, instruction) for file control, window control, image processing, or text control.

The input/output interface 150 may function as, for example, an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display, for example, various types of contents (for example, text, images, videos, icons, or symbols) for the user. The display 160 may include a touch screen and receive, for example, a touch, gesture, proximity, or hovering input through an electronic pen or the user's body part.

The communication interface 170 may set communication between, for example, the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106). The communication interface may include hardware such as a transmitter, receiver, transceiver, antenna(s), codec(s), etc.

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include, for example, short-range communication 164. The short-range communication 164 may be performed by using at least one of, for example, Wi-Fi, Bluetooth, Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of a communication network such as a computer network (for example, a LAN or a WAN), the Internet, and a telephone network.

Each of the first and second external electronic devices 102 and 104 may be a device which is the same device, or a different than the electronic device 101. According to an embodiment, the server 106 may include a group of one or more servers. According to various embodiments, all or some of the operations performed in the electronic device 101 may be performed in another electronic device or a plurality of electronic devices (for example, the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic device (for example, the electronic device 102 or 104, or the server 106) may execute the requested functions or the additional functions, and may deliver a result of the execution to the electronic device 101. The electronic device 101 may process the received result as it is or additionally to provide the requested functions or services. To achieve this, for example, cloud computing, distributed computing, or client-server computing technology may be used.

The processor 120 may process at least some of the information obtained from other components (for example, at least one of the memory 130, the input/output interface 150, and the communication interface 170) and utilize the same in various manners. For example, the processor 120 may control at least some functions of the electronic device 101 so that the electronic device 101 may interwork with other electronic devices (for example, the electronic device 102 or 104 or the server 106). The processor 120 may be integrated with the communication interface 170. According to an embodiment, at least one component of the processor 120 may be included in the server 106 and at least one operation implemented by the processor 120 may be supported by the server 106.

According to an embodiment, the memory 130 may include instructions to operate the processor 120. For example, the memory 130 may include instructions for allowing the processor 120 to control other elements of the electronic device 101 and to interwork with other electronic devices 102 and 104 or the server 106. The processor 120 may control other components of the electronic device 101 and interwork with other electronic devices 102 and 104 or the server 106 based on the instructions stored in the memory 130. Hereinafter, the operations of the electronic device 101 will be described based on the respective components of the electronic device 101. Further, the instructions for allowing the receptive components to perform the operations may be included in the memory 130.

The communication interface 170, according to various embodiments of the present disclosure, may receive a first signal including first information of a media device through first communication mode. The communication interface 170 may receive the first signal including the first information of the media device through the first communication mode which is one of the communications supported by the communication interface 170.

The media device may be a device that provides audio and/or video contents. The media device may broadcast the first signal including the first information of the media device through wireless communication (for example, Bluetooth, Wi-Fi, ANT, or the like) supported by the media device. Further, according to an embodiment, the media device may transmit the first signal to the electronic device 101 through wireless communication according to a request of the electronic device 101.

According to various embodiments of the present disclosure, the first information of the media device included in the first signal may include at least one piece of information on a configuration state of the media device, information on an operation state of the media device, device information of the media device, and connection information of the media device.

For example, the information on the configuration state of the media device may include information indicating whether the media device is in an initial configuration state where the configuration is not performed, whether the configuration is initialized as the media device is reset, and whether the configuration is performed by the electronic device 101.

The information on the operating state of the electronic device may include information indicating whether the media device is currently in a turned-on state or a turned-off state. Further, the device information of the media device may include a device name of the media device and capability information of the media device.

In addition, the connection information of the media device may be information used for performing a connection through communication supported by the media device. For example, when the media device supports communication such as Bluetooth, BLE, and the like, the connection information of the media device may include a Bluetooth Media Access Control (MAC) address, a BLE MAC address, and the like. Further, the connection information of the media device may include information for rapidly performing the connection with the media device. For example, the connection information of the media device may include information on a window, a frequency, and a channel type (for example, standard, interlaced, or the like).

The first information of the media device may include information which should be provided for the connection between the electronic device 101 and the media device and/or information which should be provided to receive configuration information that can be used for configuring the media device.

The information included in the first information of the media device is only a non-limiting example, and the present disclosure is not limited thereto. The first information of the media device may include information which is used for identifying the media device having transmitted the first signal.

According to various embodiments of the present disclosure, the processor 120 may generate a second signal including identification information of the media device by using at least a part of the first information in response to the first signal. The processor 120 may generate the second signal in order to respond to the first signal.

The identification information may be information generated using at least the part of the first information. The identification information may be generated in various methods according to the type or kind of information included in the first information.

For example, the identification information may be generated by performing a shift operation on at least the part of the first information or generated using a key used for encrypting at least the part of the first information or a random number used for changing at least the part of the first information. Further, the identification information may be generated using a hash value, which is generated using at least the part of the first information, and, when second information at least partially different (e.g. not exactly the same as, or not identical) from the first information is received, generated using at least the part of each of the first information and the second information.

Various embodiments for generating the identification information are only one non-limiting example provided, and the present disclosure is not limited thereto. The identification information may be information used for indicating that the first signal is received and the first information included in the first signal is identified. The identification information is distinguished from the first information and may be generated through at least the part of the first information included in the first signal. The identification information may be distinguished from the information on the configuration state of the media device, the information on the operation state of the media device, the device information of the media device, and the connection information of the media device, which are included in the first information, and may be generated through at least a part of each piece of information included in the first information.

According to various embodiments of the present disclosure, the processor 120 includes circuitry configured to control the communication interface 170 to transmit the second signal to the media device through the first communication mode. The processor 120 may generate and transmit the second signal including the identification information to the media device in response to the first signal to form a highly secured communication channel, thereby performing the connection with the media device.

According to various embodiments of the present disclosure, the electronic device 101 may further include a sensor that receives a third signal including the second information at least partially different from the first information through a second communication mode. The second communication mode corresponds to a communication mode different from that of the first communication mode, and may receive a signal through a sensor separated from the communication interface 170. For example, the second communication mode may be performed through the sensor separated from the communication interface 170, such as communication using ultrasonic waves, communication using a sound, communication using a visual signal (for example, a light emitting signal, a QR code, and a vision signal), and communication using a smell (a smell beacon).

The sensor may be arranged to receive the third signal transmitted from the media device through the second communication mode, such as a microphone, a camera, or the like according to the second communication mode.

Hereinafter, although it will be described that the second communication mode is performed using the sensor separated from the communication interface 170, the present disclosure is not limited thereto. The second communication mode may be one of the communication modes supported by the communication interface 170. The reception of the third signal through the second communication mode is to identify the media device and to determine whether to transmit the second signal including the identification information to the media device. Accordingly, the second communication mode may operate utilizing any communication mode which is different from that of the first communication mode.

Similar to the first information, the second information may include at least one piece of the information regarding the configuration state of the media device, the information on the operation state of the media device, the device information of the media device, and the connection information of the media device. However, at least one piece of the information included in the second information may be different from the information included in the first information. The media device may generate the second information in such a manner that at least the part of the second information is different from the first information.

According to various embodiments of the present disclosure, when it is identified that the media device is in a state where the configuration has not been performed based on the first information included in the first signal, the processor 120 may control the sensor to become active. In order to reduce power consumption, the processor 120 may control determining whether to activate the sensor based on state of the media device. Accordingly, when it is determined that the configuration of the media device is needed, the processor 120 may control the sensor to be activated. For example, when the media device is in a state where a driving environment has not been configured, or when the media device is reset, the processor 120 may determine that the configuration of the media device is needed.

According to various embodiments of the present disclosure, the processor 120 may identify whether the first signal and the third signal are received from the same media device. The processor may identify the media devices having transmitted the first signal and the third signal, and check whether or not the first signal and the third signal are received from the same media device based on a result of the identification.

For example, the processor 120 perform a comparison function by comparing one or more information items included in each portion of the first information included in the first signal and the second information included in the third signal. For example, the processor 120 may compare connection information for the first communication mode included in each piece of the first information and the second information. The processor 120 may perform the comparison process to identify the media devices having transmitted the first signal and the third signal. Accordingly, the processor 120 may identify whether the first signal and the third signal are received from the same media device.

According to an embodiment, the processor 120 may identify whether or not the first signal and the third signal are received from the same media device by comparing the connection information for the first communication mode (for example, an MAC address of the first communication mode) included in a header region of the first signal and the connection information for the first communication mode (an MAC address of the first communication mode) included in the third signal.

However, the above content is only one non-limiting example, and the present disclosure is not limited thereto. The processor 120 may identify whether or not the first signal and the third signal are received from the same media device by using other information as well as the connection information of the first information and the second information included in the first signal and the third signal.

The processor 120 may identify whether the first signal and the third signal are received from the same media device and determine whether to generate identification information according to a result of the identification. For example, when the first signal and the third signal are received from the same media device, the processor 120 may generate the identification information.

As described above, when it is identified that the first signal and the third signal are received from the same media device, the processor 120 may be configured to generate the identification information to form a highly secured communication channel, thereby performing the connection with the media device.

According to various embodiments of the present disclosure, the processor 120 may be configured to perform the connection with the media device through the communication interface 170 by using the first information. The processor 120 may perform the connection with the media device through e third communication mode, which is a different mode than the first communication mode and the second communication mode without a search process for the connection using the first information.

As described above, when the media device is identified through the first signal and the third signal and it is identified that the first signal and the third signal are received from the same media device, the processor 120 may be configured to perform the connection through the third communication mode by using connection information for the third communication mode, which is a different communication mode, included in at least one piece of the first information and the second information without a separate search process.

According to various embodiments of the present disclosure, the processor 120 may identify configuration information which is used for the configuration of the media device. The processor 120 may identify the configuration information which is used for the configuration of the media device based on the first information included in the first signal. Further, when the configuration information which is used for the configuration of the media device cannot be identified, the processor 120 may receive the configuration information, be used for the configuration of the media device, through an external server.

The processor 120 may control the transmission of the identified or received configuration information, which is used for the configuration of the media device, to the media device. The media device may receive the configuration information and perform the configuration for the driving environment.

Figure 2:
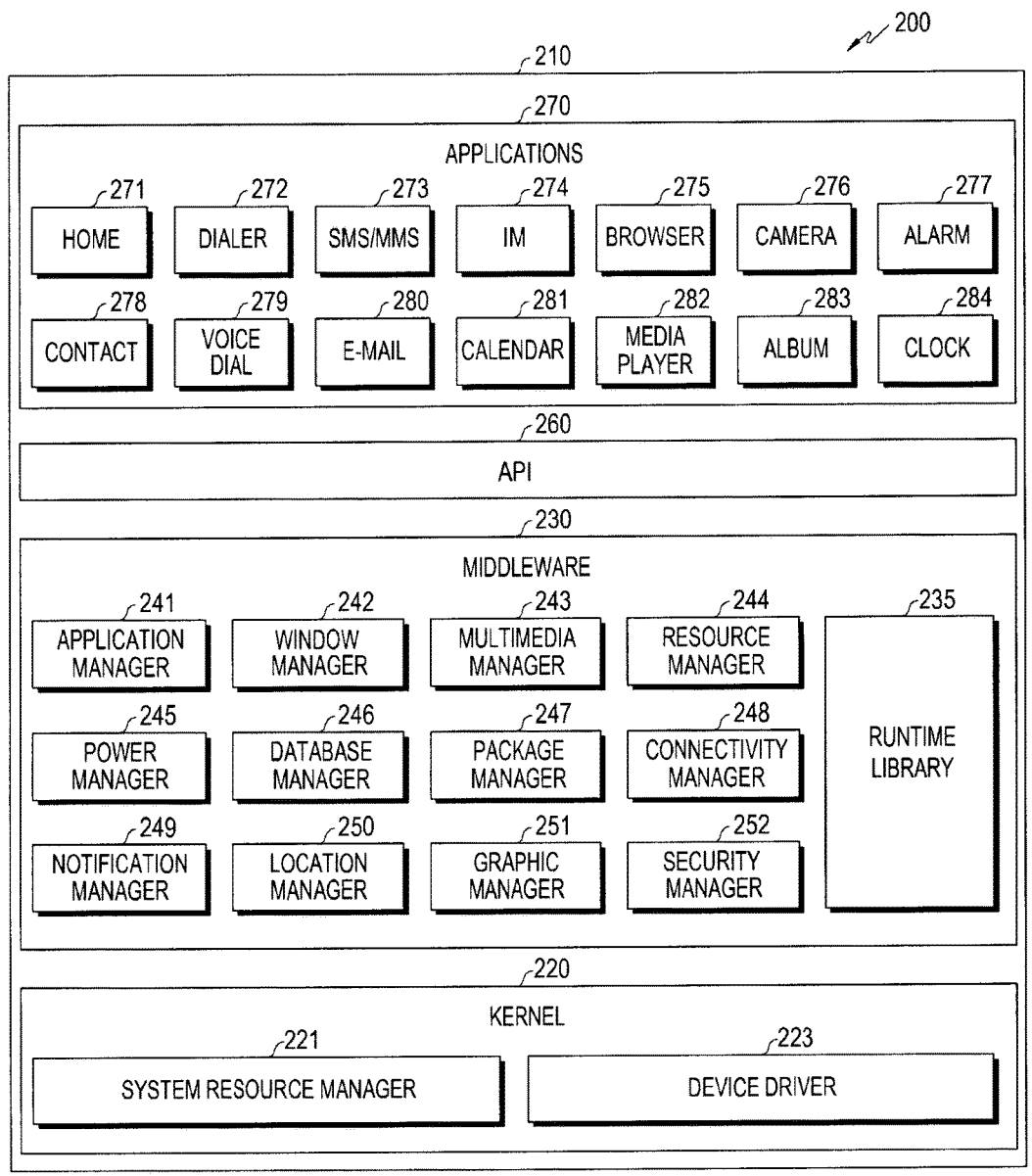
FIG. 2 is a block diagram of a program module according to various embodiments of the present disclosure.

FIG. 2 is a block diagram of a program module according to various embodiments of the disclosure. According to an embodiment, the program module 210 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like, just to name some non-limiting possibilities.

The program module 210 may include a kernel 220, middleware 230, an Application Programming Interface (API) 260, and/or applications 270. At least some of the program module 210 may be preloaded on the electronic device, or may be downloaded from an external electronic device (for example, the electronic device 102 or 104, or the server 106).

The kernel 220 (for example, the kernel 141) may include, for example, a system resource manager 221 and/or a device driver 223. The system resource manager 221 may perform the control, allocation, retrieval, or the like of system resources. According to an embodiment, the system resource manager 221 may include a process manager, a memory manager, a file system manager, or the like. The device driver 223 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 230 may provide, for example, a function commonly required by the applications 270, or may provide various functions to the applications 270 through the API 260 so that the applications 270 can efficiently use limited system resources within the electronic device. According to an embodiment, the middleware 230 (for example, the middleware 143) may include, for example, at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The runtime library 235 may include a library module which a compiler uses in order to add a new function through a programming language while the applications 270 are being executed. The runtime library 235 may perform input/output management, memory management, the functionality for an arithmetic function, or the like.

The application manager 241 may manage, for example, a life cycle of at least one of the applications 270. The window manager 242 may manage Graphical User Interface (GUI) resources used for the screen. The multimedia manager 243 may determine a format required to reproduce various media files, and may encode or decode a media file by using a coder/decoder (codec) appropriate for the corresponding format. The resource manager 244 may manage resources, such as a source code, a memory, a storage space, and the like of at least one of the applications 270.

The power manager 245 may operate together with a Basic Input/Output System (BIOS) to manage a battery or power, and may provide power information required for the operation of the electronic device. The database manager 246 may generate, search for, and/or change a database to be used by at least one of the applications 270. The package manager 247 may manage the installation or update of an application distributed in the form of a package file.

The connectivity manager 248 may manage a wireless connection such as, for example, Wi-Fi or Bluetooth. The notification manager 249 may display or notify of an event, such as an arrival message, an appointment, a proximity notification, and the like, in such a manner as not to disturb the user. The location manager 250 may manage location information of the electronic device. The graphic manager 251 may manage a graphic effect, which is to be provided to the user, or a user interface related to the graphic effect. The security manager 252 may provide various security functions required for system security, user authentication, and the like. According to an embodiment, when the electronic device (for example, the electronic device 101) has a telephone call function, the middleware 230 may further include a telephony manager for managing a voice call function or a video call function of the electronic device.

The middleware 230 may include a middleware module that forms a combination of various functions of the above-described elements. The middleware 230 may provide a module specialized for each type of OS in order to provide a differentiated function. Also, the middleware 230 may dynamically delete some of the existing elements, or may add new elements.

With continued reference to FIG. 2, the API 260 (for example, the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 270 (for example, the application programs 147) may include, for example, one or more applications which can provide functions such as home 271, dialer 272, SMS/MMS 273, Instant Message (IM) 274, browser 275, camera 276, alarm 277, contacts 278, voice dial 279, email 280, calendar 281, media player 282, album 283, clock 284, health care (for example, measure exercise quantity or blood sugar), or environment information (for example, atmospheric pressure, humidity, or temperature information).

According to an embodiment, the applications 270 may include an application (hereinafter, referred to as an "information exchange application" for convenience of description) supporting information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of transferring, to the external electronic device (for example, the electronic device 102 or 104), notification information generated from other applications of the electronic device (for example, an SMS/MMS application, an e-mail application, a health management application, or an environmental information application). Further, the notification relay application can, for example, receive notification information from the external electronic device and provide the received notification information to a user.

The device management application may manage (for example, install, delete, or update), for example, at least one function of an external electronic device (for example, the electronic device 102 or 104) communicating with the electronic device (for example, a function of turning on/off the external electronic device itself (or some components) or a function of adjusting luminance (or a resolution) of the display), applications operating in the external electronic device, or services provided by the external electronic device (for example, a call service and a message service).

According to an embodiment, the applications 270 may include applications (for example, a health care application of a mobile medical appliance or the like) designated according to attributes of the external electronic device 102 or 104. According to an embodiment, the applications 270 may include an application received from the external electronic device (for example, the server 106, or the electronic device 102 or 104). According to an embodiment, the applications 270 may include a preloaded application or a third party application which is downloaded from the server. Names of the elements of the program module 210, according to the above-described embodiments of the present disclosure, may change depending on the type of OS.

According to various exemplary embodiments of the present disclosure, at least some of the program module 210 may be implemented in software in conjunction with hardware, firmware, hardware, or a combination thereof. At least some of the program module 210 may be implemented (e.g., executed) by, for example, the processor (e.g., the processor 210). At least some of the program module 210 may include, for example, a module, a program, a routine, a set of instructions, and/or a process for performing one or more functions.

Figure 3:
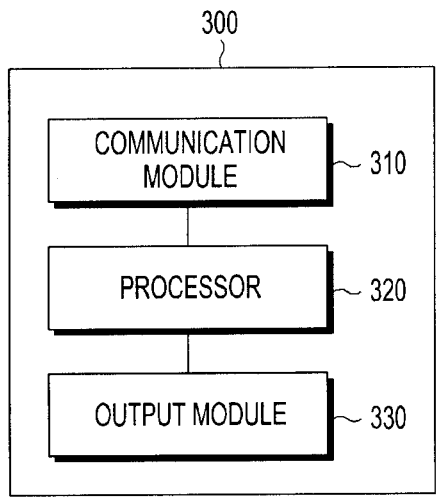
FIG. 3 is a block diagram illustrating a media device according to various embodiments of the present disclosure.

FIG. 3 is a block diagram illustrating a media device according to various embodiments of the present disclosure.

A media device 300 according to various embodiments of the present disclosure may include a communication module 310, a processor 320, and an output module 330.

The communication module 310, which includes hardware such as a transceiver, receiver, transmitter, antenna, codec, microprocessor, etc., according to various embodiments of the present disclosure may transmit a first signal including first information of the media device 300. For example, the communication module 310 may broadcast the first signal including the first information of the media device 300 through short-range wireless communication. The communication module 310 may continuously broadcast the first signal even in a state where the media device 300 is turned off.

According to various embodiments of the present disclosure, the first information of the media device 300 may include at least one piece of information regarding a configuration state of the media device 300, information regarding an operation state of the media device 300, device information of the media device 300, and connection information of the media device 300.

According to various embodiments of the present disclosure, the communication module 310 may receive a second signal including identification information generated by using at least a part of the first information from the electronic device 101, whereby electronic device 101 has received the first signal. Since the method by which the electronic device 101 generates the second signal including the identification information by using at least the part of the first information has been described through FIG. 1, a separate description thereof will be omitted.

According to various embodiments of the present disclosure, the processor 320, may be configured to determine whether the identification information is valid. For example, the processor 320 may determine whether the identification information is valid by identifying whether the identification information is generated using at least the part of the first information.

A preset generation method between the electronic device 101 and the media device 300 may be determined as the method of generating the identification information. Accordingly, the media device 300 may determine whether the identification information is valid by identifying whether the identification information is generated through the preset generation method.

For example, when the identification information is generated using the first information and at least a part of second information at least partially different (e.g. not exactly the same) from the first information, the media device 300 may determine whether the identification information is valid by identifying whether the identification information includes at least the part of the first information and the second information.

Further, when the identification information is generated using a random number, the media device 300 may determine whether the identification information is valid by identifying whether the identification information includes the random number.

In addition, when the identification information is generated using a random number which is generated by the media device 300, the media device 300 may determine whether the identification information is valid by using the identification information includes the random number generated by the media device 300.

As described above, since the method of generating the identification information may be shared between the electronic device 101 and the media device 300, it is apparent to those skilled in the art that various methods of generating identification information and various methods of determining whether the identification is valid in corresponding to the methods can be applied to the present disclosure.

According to various embodiments of the present disclosure, the output module 330 may output the third signal including the second information different from the first information through the second communication mode. As illustrated in FIG. 1, the second communication mode may output the signal through the output module 330 separated from the communication module 310 through the communication mode different from that of the first communication mode. For example, the second communication mode may be output or transmitted through the output module 330 separated from the communication module 310, such as communication using ultrasonic waves, communication using a sound, communication using a visual signal (for example, a light emitting signal, a QR code, and a vision signal), and communication using a smell (a smell beacon).

The output module 330 may be an output module which is used for outputting or transmitting the third signal through the second communication mode, such as a speaker or a display according to the second communication mode.

As illustrated in FIG. 1, when the first signal and the third signal are transmitted or output from the same media device, the identification information may be generated. All portions of information for identifying the media device, which are included in the first information, may be used for information for determining whether to generate the identification information.

According to various embodiments of the present disclosure, the processor 320 may generate a random number for changing at least a part of the first information. The processor 320 may change at least the part of the first information based on the generated random number in order to perform the connection with the electronic device 101 through a security enhanced channel.

The processor 320 may change at least the part of the first information by using the random number and insert the random number into the first information. Further, the processor 320 may encode at least the part of the first information through a key for the encoding. The processor 320 may insert the key for the encoding into the first information. The electronic device 101 may reconstruct at least the changed part of the first information by using the random number included in the first information or decode at least the encoded part by using the key included in the first information. The changing and reconstructing method and the encoding and decoding method through the random number may be shared between the electronic device 101 and the media device 300.

Further, the processor 320 may generate a random number for determining whether the identification information included in the second signal is valid and insert the random number into the first information. Accordingly, the processor 320 may determine whether the identification information is valid by identifying whether the identification information includes the random number.

According to various embodiments of the present disclosure, when receiving the second signal, the processor 320 may make a control to display a popup window or a message indicating that a configuration for the media device 300 can be performed through the electronic device 101. Through the displaying of the popup window or the message, it is possible to inform the user that the configuration of the media device 300 can be performed through the electronic device 101, so that more improved usability can be provided.

According to various embodiments of the present disclosure, when it is determined that the identification information is valid, the processor 320 may perform the connection with the electronic device 101 through the communication module 310 in response to the second signal. The processor 320 may perform the connection with the electronic device 101 through the third communication mode without a separate connection process such as a search to perform the connection through the third communication mode which is different from the first communication mode and the second communication mode.

According to various embodiments of the present disclosure, after the connection, the communication module 310 may receive configuration information which is used for the configuration of the media device 300 from the electronic device 101. The processor 320 may perform the configuration for the driving environment of the media device 300 based on the received configuration information.

Figure 4:
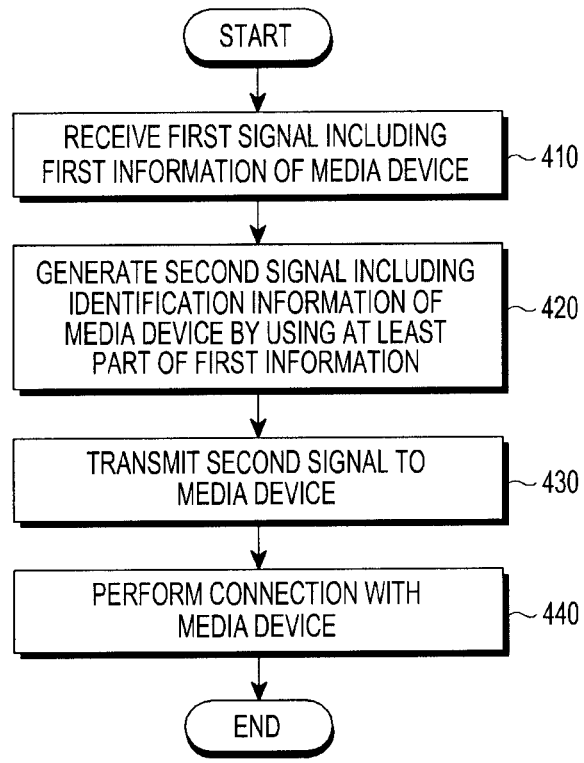
FIG. 4 is a flowchart illustrating a non-limiting operational example of a method of performing a connection by an electronic device according to various embodiments of the present disclosure.

FIG. 4 is a flowchart illustrating a method of performing a connection by the electronic device according to various embodiments of the present disclosure.

In operation 410, the electronic device 101 may receive a first signal including first information of the media device through first communication mode. The first information of the media device included in the first signal may include at least one piece of information on a configuration state of the media device, information on an operation state of the media device, device information of the media device, and connection information of the media device.

In operation 420, the electronic device 101 may generate a second signal including identification information by using at least a part of the first information in response to the first signal. The processor 320 may generate the second signal in order to respond to the first signal. The identification information may be generated in various methods according to the type or kind of information included in the first information.

In operation 430, the electronic device 101 may transmit the second signal including the identification information to the media device through the first communication mode. The electronic device 101 may transmit the second signal including the identification information to the media device in response to the first signal to form a highly secured communication channel, thereby performing the connection with the media device.

In operation 440, the electronic device 101 may perform the connection with the media device by using the first information. Further, the electronic device 101 may perform the connection with the media device through third communication mode, which is different from the first communication mode and the second communication mode, without a search process for the connection using the first information.

Figure 5:
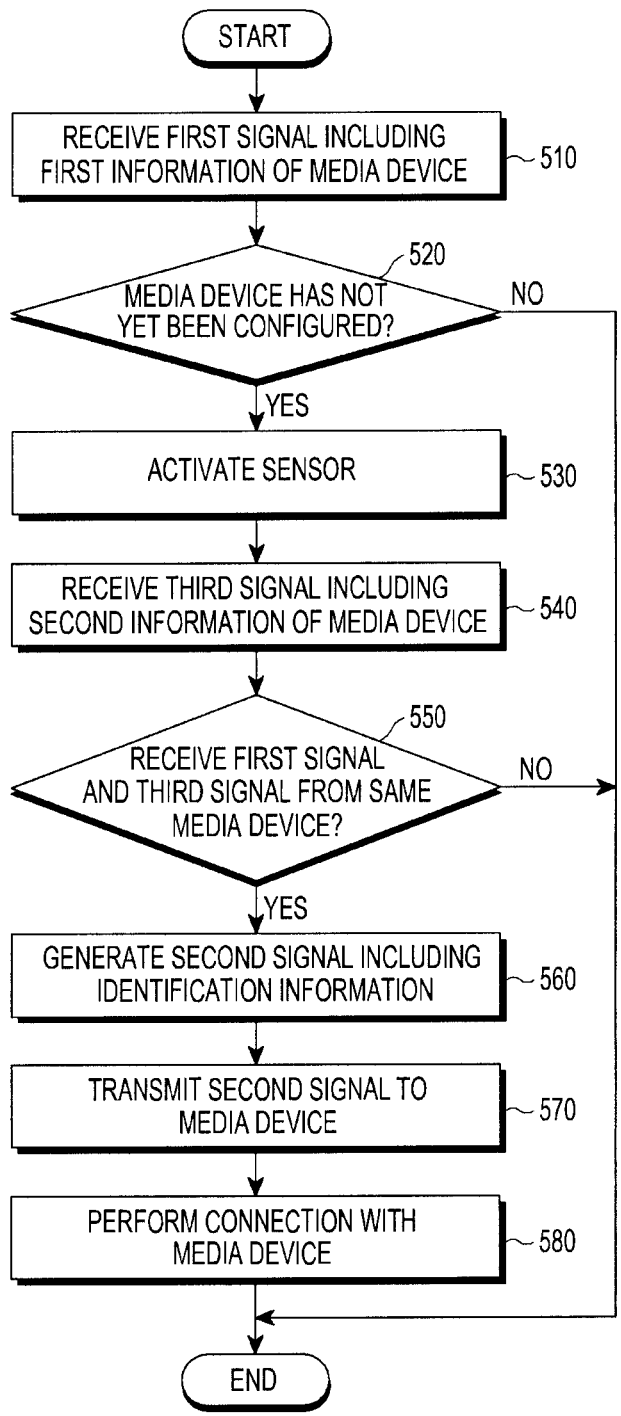
FIG. 5 is a flowchart illustrating a non-limiting operational example of a method of performing a connection by the electronic device according to various embodiments of the present disclosure.

FIG. 5 is a flowchart illustrating a method of performing a connection by the electronic device according to various embodiments of the present disclosure.

FIG. 5 concretely illustrates the method of performing the connection after the media device is identified through first communication mode and second communication mode.

In operation 510, the electronic device 101 may receive a first signal including first information of the media device through first communication mode.

In operation 520, the electronic device 101 may identify whether the media device has not yet been configured, based on the first information. For example, the electronic device 101 may identify whether the media device has not yet been configured, by using information on a configuration state of the media device included in the first information. More specifically, the electronic device 101 may identify whether the media device has not yet been configured for the driving environment or the media device had been reset and requires the configuration for the driving environment.

When it is determined that the media device has not yet been configured, the electronic device 101 may activate a sensor included in the electronic device 101 in operation 530. In operation 540, the electronic device 101 may receive a third signal including second information at least partially different from the first information through the activated sensor.

In operation 550, the electronic device 101 may identify whether the first signal and the third signal are received from the same media device. The electronic device 101 may identify the media device having transmitted the first signal and the third signal and whether the first signal and the third signal are received from the media device based on a result of the identification.

As described above, in order to identify the media device and whether the first signal and the third signal are received from the same media device, all the one or more information items included in each portion of the first information and the second information may be used.

When it is identified that the first signal and the third signal are received from the same media device, the electronic device 101 may generate a second signal including identification information in operation 560. The identification information may be generated in various methods according to the type or kind of information included in the first information and the second information.

In operation 570, the electronic device 101 may transmit the second signal including the identification information to the media device. In operation 580, the electronic device 101 may perform the connection with the media device by using at least one of the first information and the second information.

Figure 6:
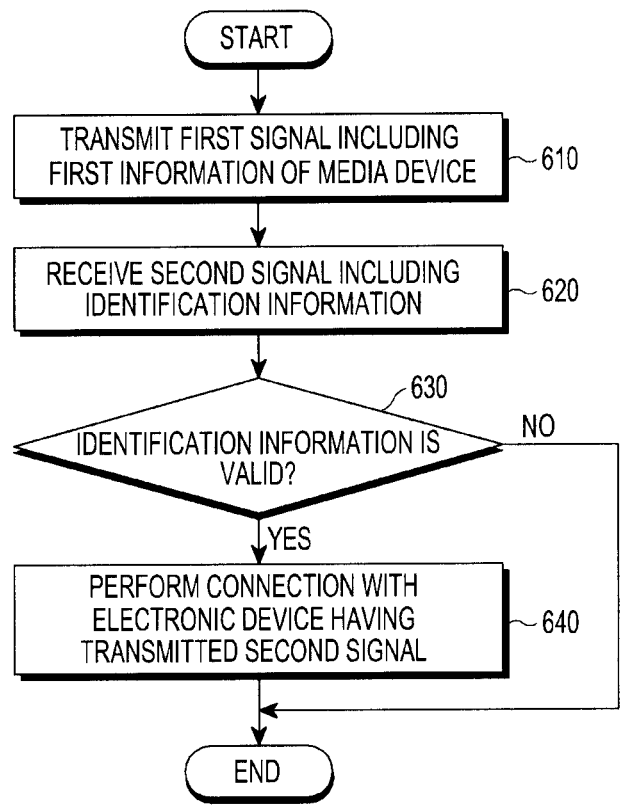
FIG. 6 is a flowchart illustrating a non-limiting operational example of a method of performing a connection by the media device according to various embodiments of the present disclosure.

FIG. 6 is a flowchart illustrating a method of performing a connection by the media device according to various embodiments of the present disclosure.

In operation 610, the media device 300 may transmit a first signal including first information of the media device 300. For example, the media device 300 may broadcast the first signal including the first information of the media device 300 through short-range wireless communication.

In operation 620, the media device 300 may receive a second signal including identification information which is generated using at least a part of the first information from the electronic device 101 having received the first signal.

In operation 630, the media device 300 may determine whether the identification information is valid. A preset generation method between the electronic device 101 and the media device 300 may be determined as the method of generating the identification information. Accordingly, the media device 300 may determine whether the identification information is valid by identifying whether the identification information is generated through the preset generation method.

In operation 640, when it is determined that the identification information is valid, the media device 300 may perform the connection with the electronic device 101 through the communication module 310 in response to the second signal. Further, when receiving the second signal, the media device 300 may make a control to display a popup window or a message indicating that the configuration for the media device 300 can be performed through the electronic device 101. Through the displaying of the popup window or the message, it is possible to inform the user that the configuration of the media device 300 can be performed through the electronic device 101, so that more improved usability can be provided.

Figure 7:
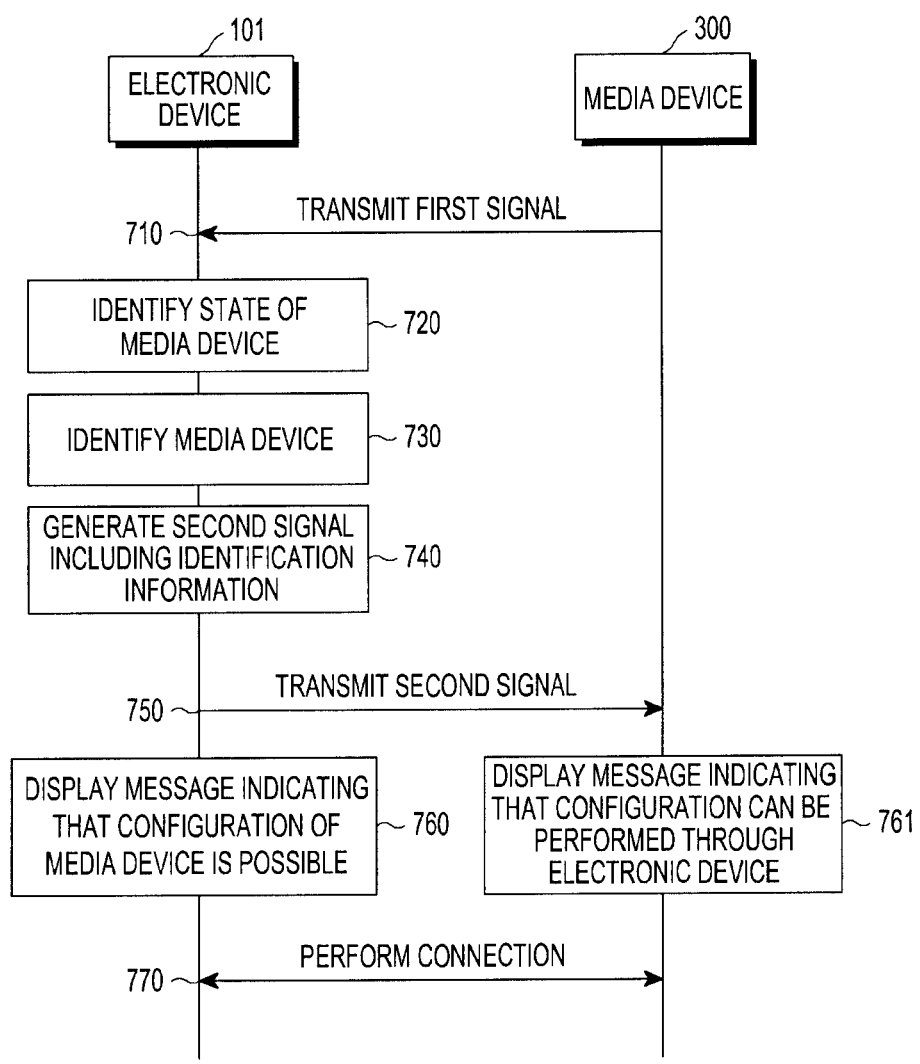
FIG. 7 is a flowchart illustrating a non-limiting operational example of a method of performing a connection by the electronic device and the media device according to various embodiments of the present disclosure.

FIG. 7 is a flowchart illustrating a method of performing a connection by the electronic device and the media device according to various embodiments of the present disclosure.

FIG. 7 illustrates an overall flow of the method of performing the connection by the electronic device 101 and the media device 300 which has been described in FIGS. 4 and 6.

In operation 710, the media device 300 may transmit the first signal including the first information of the media device 300. The media device 300 may periodically broadcast the first signal through the first communication mode. The media device 300 may broadcast the first signal regardless of the configuration state of the media device 300 or broadcast the first signal only when the media device 300 has not yet been configured.

In operation 720, the electronic device 101 may identify a state of the media device 300 based on the first information of the media device 300 included in the first signal. For example, the electronic device 101 may identify whether the media device 300 has not yet been configured for the driving environment or the media device 300 had been reset and requires the configuration for the driving environment. Further, the electronic device 101 may identify whether the configuration for the driving environment should be performed or changed according to each service supported by the media device 300.

In operation 730, the electronic device 101 may identify the media device 300 by using the first information. For example, the electronic device 101 may identify the media device 300 through device information of the media device 300 included in the first information or connection information of the first communication mode included in the first information (for example, an MAC address for the first communication mode).

In operation 740, the electronic device 101 may generate the second signal including identification information by using at least the part of the first information. The identification information may be generated in various methods according to the type or kind of information included in the first information.

In operation 750, the electronic device 101 may transmit the second signal including the generated identification information to the media device 300.

After transmitting the second signal, the electronic device 101 may inform the user that the configuration of the media device 300 is possible in operation 760. For example, the electronic device 101 may display a message or a popup window indicating that the configuration of the media device 300 is possible through a display. Similarly, in operation 761, the media device 300 may inform the user that the configuration can be performed through the electronic device 101. For example, the media device 300 may display the message or the popup window indicating that the configuration can be performed through the electronic device 101 on the display.

In operation 770, the electronic device 101 may perform the connection with the media device 300 by using the first information.

Figure 8:
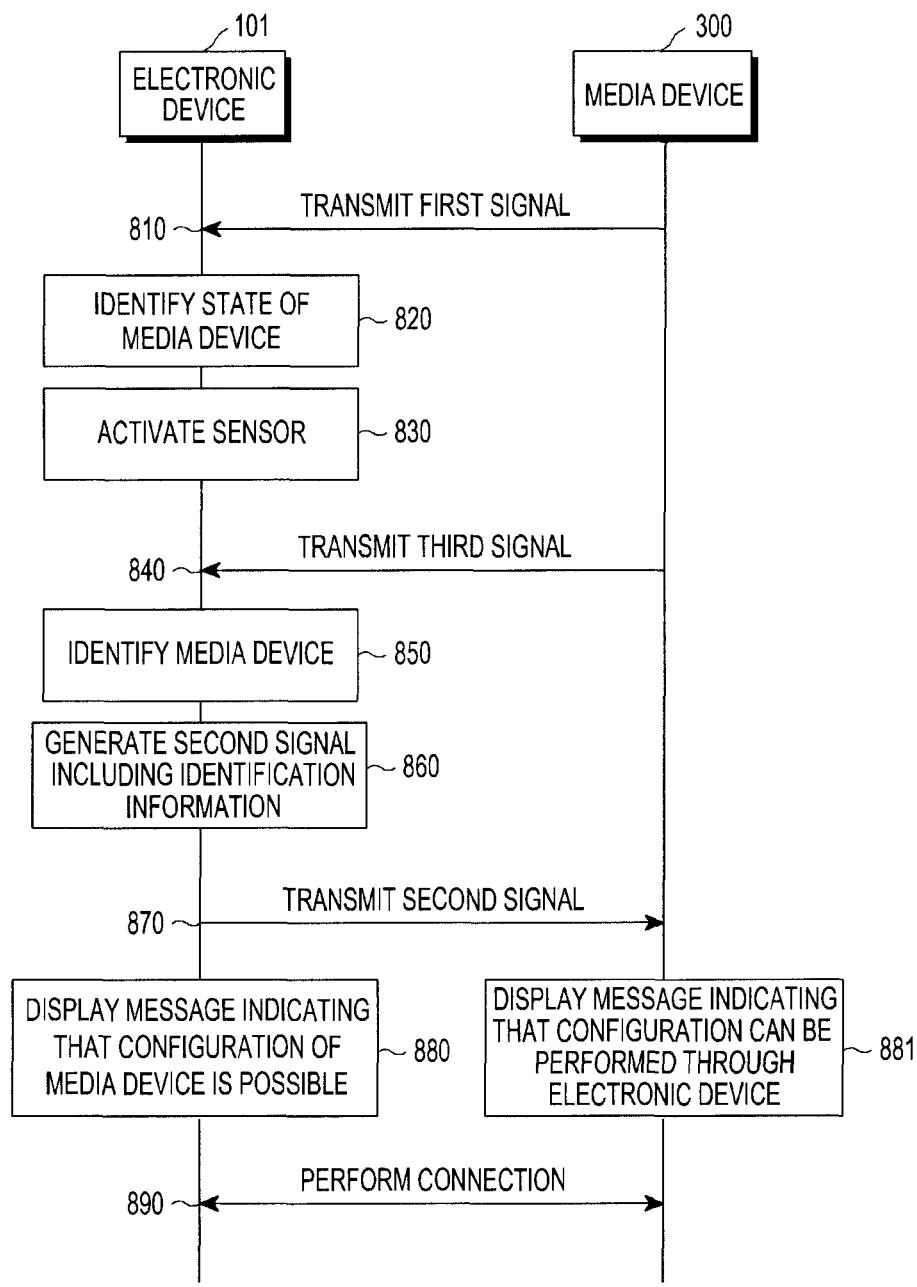
FIG. 8 is a flowchart illustrating a non-limiting operational example of a method of performing a connection by the electronic device and the media device according to various embodiments of the present disclosure.

FIG. 8 is a flowchart illustrating a method of performing a connection by the electronic device and the media device according to various embodiments of the present disclosure.

FIG. 8 illustrates an overall flow of the method of performing the connection by the electronic device 101 and the media device 300 which has been described in FIG. 5.

In operation 810, the media device 300 may transmit the first signal including the first information of the media device 300. The media device 300 may periodically broadcast the first signal through the first communication mode.

In operation 820, the electronic device 101 may identify a state of the media device 300 based on the first information of the media device 300 included in the first signal.

When it is identified that the media device has not yet been configured, the electronic device 101 may activate a sensor included in the electronic device 101 in operation 830. In operation 840, the electronic device 101 may receive the third signal including the second information at least partially different from the first information through the activated sensor.

In operation 850, the electronic device 101 may identify the media device having transmitted the first signal and the third signal. Further, the electronic device 101 may determine whether the first signal and the third signal are received from the same media device based on a result of the identification. For example, in order to identify whether the first signal and the third signal are received from the same media device, the electronic device 101 may compare one or more pieces of information included in each of the first signal and the third signal. The electronic device 101 may determine whether the first signal and the third signal are received from the same media device based on a result of the comparison between the one or more information items.

When the first signal and the third signal are received from the same media device, the electronic device 101 may generate the second signal including identification information in operation 860. The identification information may be generated in various methods according to the type or kind of information included in the first information and the second information.

In operation 870, the electronic device 101 may transmit the second signal including the identification information to the media device 300.

After transmitting the second signal, the electronic device 101 may inform the user that the configuration of the media device 300 is possible in operation 880. For example, the electronic device 101 may display a message or a popup window indicating that the configuration of the media device 300 is possible through a display. Similarly, in operation 881, the media device 300 may inform the user that the configuration can be performed through the electronic device 101. For example, the media device 300 may display the message or the popup window indicating that the configuration can be performed through the electronic device 101 through the display.

In operation 890, the electronic device 101 may perform the connection with the media device 300 by using at least one of the first information and the second information.

Figure 9:
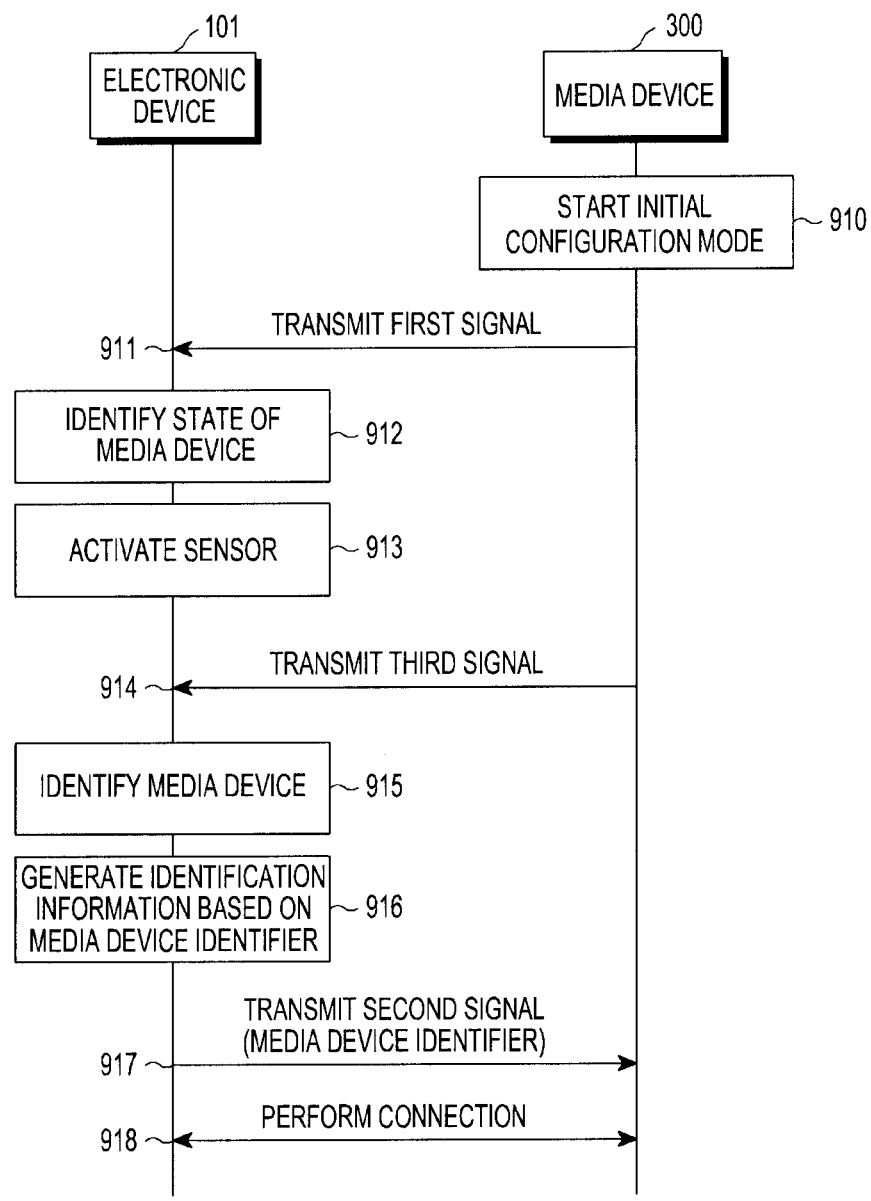
FIG. 9 is a flowchart illustrating a non-limiting operational example of a method of performing a connection using a media device identifier by the electronic device according to various embodiments of the present disclosure.

FIG. 9 is a flowchart illustrating a method of performing a connection using a media device identifier by the electronic device according to various embodiments of the present disclosure.

FIG. 9 illustrates a case where the media device identifier is used as the identification information.

Referring to FIG. 9, when the configuration for the driving environment is required such as during an initial driving or a case where the media device 300 is reset, the media device 300 may start an initial configuration mode in operation 910. In operation 911, the media device 300 may transmit a first signal including first information of the media device 300 to the electronic device 101.

In operation 912, the electronic device 101 may identify a state of the media device 300 based on the first signal. For example, the state of the media device 300 may be identified by checking configuration state information of the media device 300 included in the first signal.

When it is identified that the media device 300 has not yet been configured, the electronic device 101 may activate a sensor included in the electronic device 101 in operation 913. In operation 914, the electronic device 101 may receive a third signal including second information through the activated sensor. The media device 300 may transmit a third signal including the second information of the media device 300 through second communication mode.

In operation 915, the electronic device 101 may identify the media device 300 by using the first signal and the third signal. The electronic device 101 may identify whether the first signal and the third signal are received from the same media device by using a result of the identification.

When the first signal and the third signal are received from the same media device, the electronic device 101 may generate the identification information based on an identifier of the media device in operation 916.

The identifier of the media device may be generated using at least one of the first information and the second information. For example, the electronic device 101 may generate the identifier of the media device by performing a shift operation on a part of at least one piece of the first information and the second information.

In operation 917, the electronic device 101 may insert the generated identifier of the media device into the second signal and transmit the second signal to the media device 300.

In operation 918, the media device 300 may determine whether the identifier of the media device included in the second signal is valid. When the identifier of the media device is valid, the media device 300 may perform the connection with the electronic device 101. When the identifier of the media device is not valid, the media device 300 may not perform the connection even though the electronic device 101 makes a request for the connection.

Figure 10:
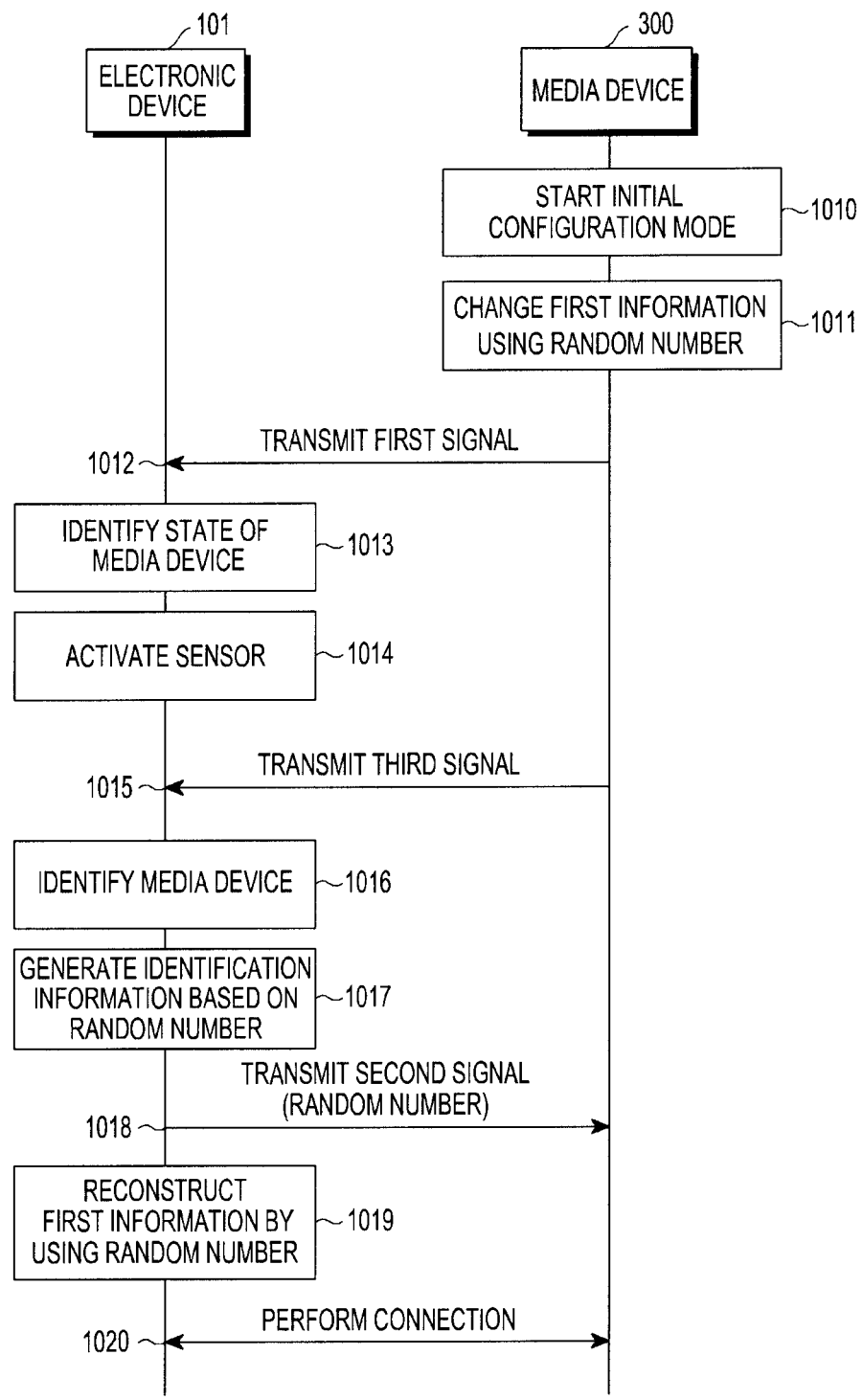
FIG. 10 is a flowchart illustrating a non-limiting operational example of a method of performing a connection by reconstructing first information based on a random number by the electronic device according to various embodiments of the present disclosure.

FIG. 10 is a flowchart illustrating a method of performing a connection by reconstructing first information based on a random number by the electronic device according to various embodiments of the present disclosure.

FIG. 10 illustrates a case where a random number is used as the identification information. Referring to FIG. 10, when the configuration for the driving environment is required such as during an initial driving or a case where the media device 300 is reset, the media device 300 may start an initial configuration mode in operation 1010.

When the random number is used as the identification information, the media device 300 may change at least a part of the first information included in the first signal by using the random number in operation 1011.

For example, the media device 300 may change a BT MAC and a P2P MAC included in connection information of the media device 300 included in the first information by using the random number. Further, in operation 1012, the media device 300 may insert the random number into the first signal and transmit the first signal to the electronic device 101.

In operation 1013, the electronic device 101 may identify a state of the media device 300 based on the first signal. For example, the state of the media device 300 may be identified by checking configuration state information of the media device 300 included in the first signal.

When it is identified that the media device 300 has not yet been configured, the electronic device 101 may activate a sensor included in the electronic device 101 in operation 1014. In operation 1015, the electronic device 101 may receive a third signal including second information through the activated sensor.

In operation 1016, the electronic device 101 may identify the media device 300 by using the first signal and the third signal. The electronic device 101 may identify whether the first signal and the third signal are received from the same media device by using a result of the identification.

When the first signal and the third signal are received from the same media device, the electronic device 101 may generate the identification information based on the random number in operation 1017.

In operation 1018, the electronic device 101 may insert the random number into the second signal and transmit the second signal to the media device 300.

In operation 1019, the electronic device 101 may reconstruct the changed first information by using the random number. For example, the electronic device 101 may reconstruct the changed BT MAC and the changed P2P MAC included in the connection information of the media device 300 included in the first information into the original BT MAC and P2P MAC.

The media device 300 may determine whether the random number included in the second signal is valid and, when the random number is valid, perform the connection with the electronic device 101 in operation 1020.

Figure 11:
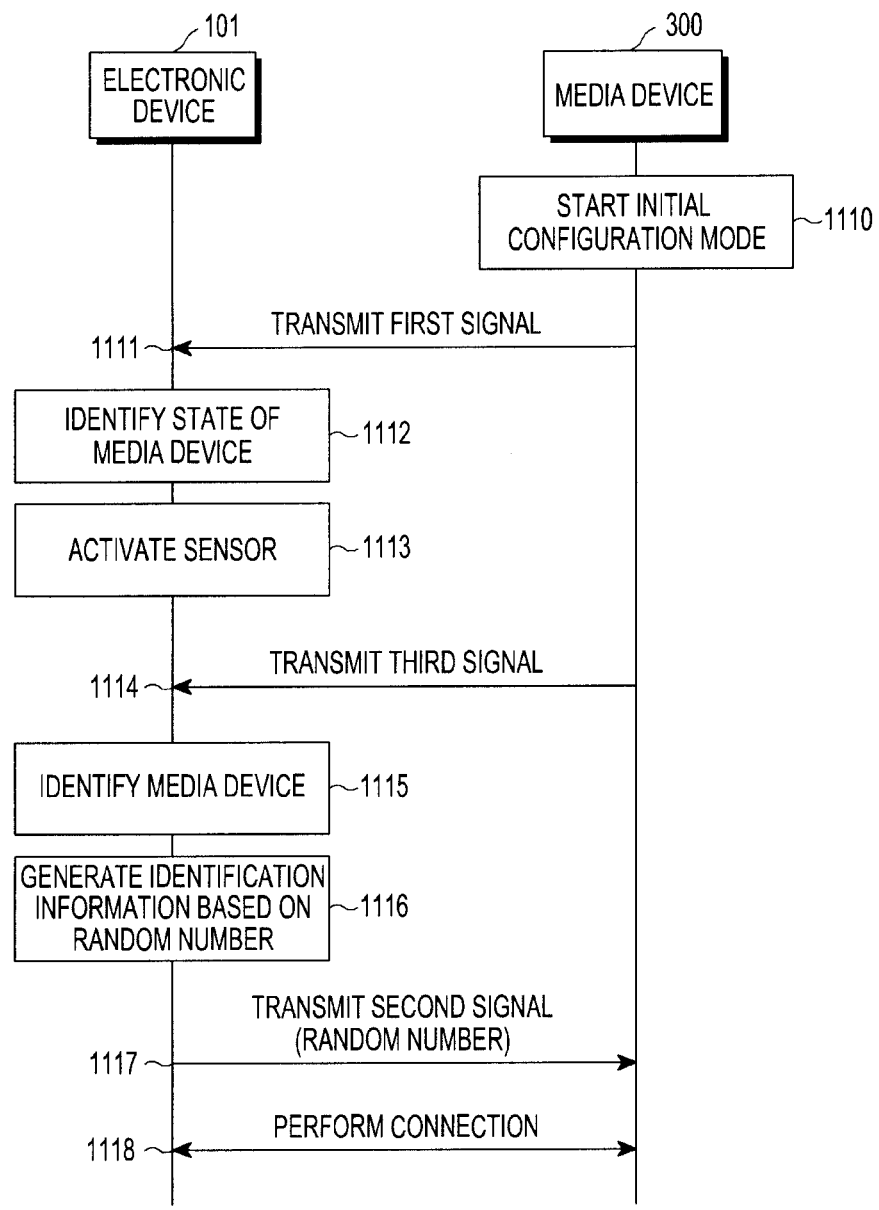
FIG. 11 is a flowchart illustrating a non-limiting operational example of a method of performing a connection using a random number by the electronic device according to various embodiments of the present disclosure.

FIG. 11 is a flowchart illustrating a method of performing a connection using a random number by the electronic device according to various embodiments of the present disclosure.

FIG. 11 illustrates a case where the random number is used as the identification information like in FIG. 10. However, in FIG. 11, it is assumed that the random number is used as the identification information without being used for changing the first information unlike in FIG. 10.

Referring to FIG. 11, when the configuration for the driving environment is required such as during an initial driving or a case where the media device 300 is reset, the media device 300 may start an initial configuration mode in operation 1110.

In operation 1111, the media device 300 may insert the random number into the first signal and transmit the first signal to the electronic device 101.

In operation 1112, the electronic device 101 may identify a state of the media device 300 based on the first signal. For example, the state of the media device 300 may be identified by checking configuration state information of the media device 300 included in the first signal.

When it is identified that the media device 300 has not yet been configured, the electronic device 101 may activate a sensor included in the electronic device 101 in operation 1113. In operation 1114, the electronic device 101 may receive a third signal including second information through the activated sensor.

In operation 1115, the electronic device 101 may identify the media device 300 by using the first signal and the third signal. The electronic device 101 may identify whether the first signal and the third signal are received from the same media device by using a result of the identification.

When the first signal and the third signal are received from the same media device, the electronic device 101 may configure the identification information based on the random number in operation 1116.

In operation 1117, the electronic device 101 may insert the random number into the second signal and transmit the second signal to the media device 300.

The media device 300 may determine whether the random number included in the second signal is valid and, when the random number is valid, perform the connection with the electronic device 101 in operation 1118.

Figure 12:
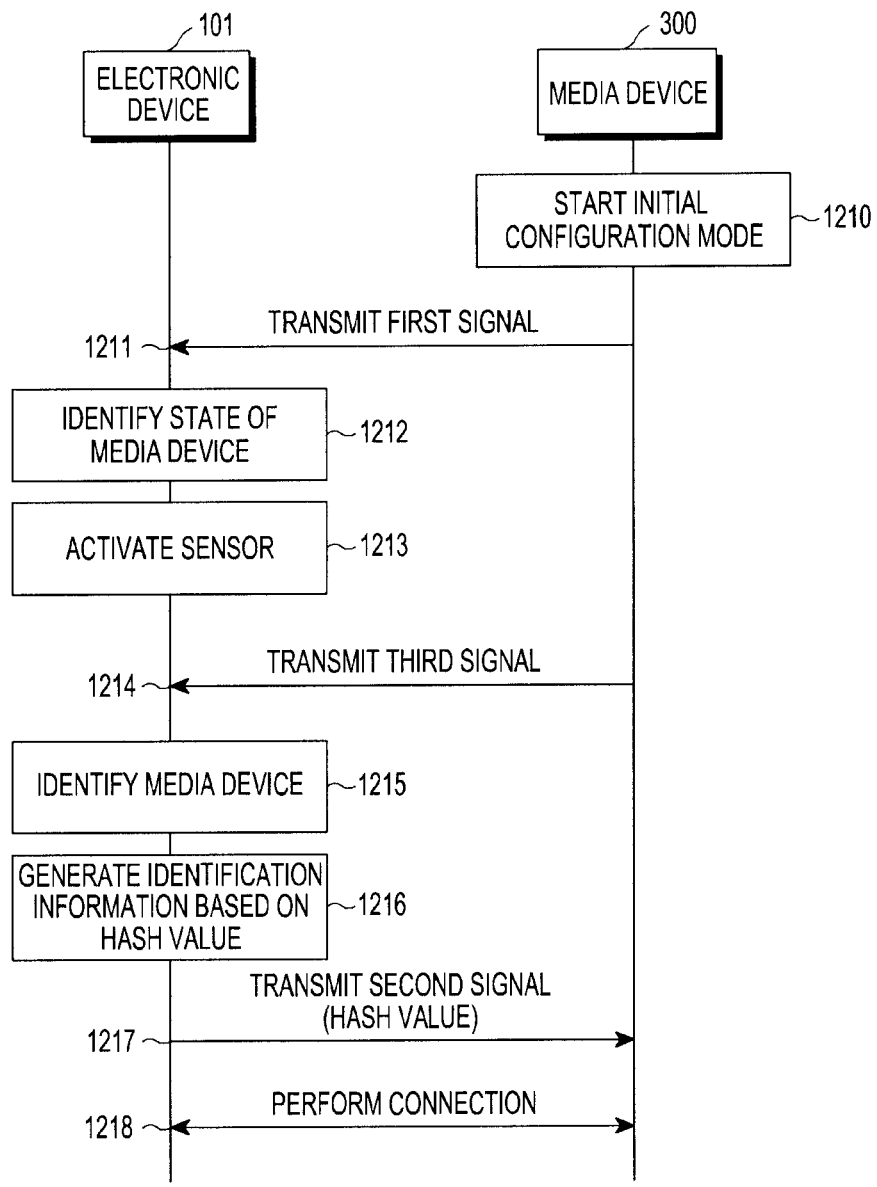
FIG. 12 is a flowchart illustrating a non-limiting operational example of a method of performing a connection using a hash value by the electronic device according to various embodiments of the present disclosure.

FIG. 12 is a flowchart illustrating a method of performing a connection using a hash value by the electronic device according to various embodiments of the present disclosure.

FIG. 12 illustrates a case where a hash value is used as the identification information.

Referring to FIG. 12, when the configuration for the driving environment is required such as during an initial driving or a case where the media device 300 is reset, the media device 300 may start an initial configuration mode in operation 1210.

In operation 1211, the media device 300 may transmit a first signal including first information of the media device 300 to the electronic device 101.

In operation 1212, the electronic device 101 may identify a state of the media device 300 based on the first signal. For example, the state of the media device 300 may be identified by checking configuration state information of the media device 300 included in the first signal.

When it is identified that the media device 300 has not yet been configured, the electronic device 101 may activate a sensor included in the electronic device 101 in operation 1213. In operation 1214, the electronic device 101 may receive a third signal including second information through the activated sensor.

In operation 1215, the electronic device 101 may identify the media device 300 by using the first signal and the third signal. The electronic device 101 may identify whether the first signal and the third signal are received from the same media device by using a result of the identification.

When the media device 300 is identified, the electronic device 101 may generate the identification information based on a hash value in operation 1216. The hash value may be generated using at least a part of the first information included in the first signal. For example, the hash value may be generated using a BT MAC included in connection information of the media device 300 included in the first information.

In operation 1217, the electronic device 101 may insert the generated hash value into the second signal and transmit the second signal to the media device 300.

The media device 300 may determine whether the hash value included in the second signal is valid and, when the hash value is valid, perform the connection with the electronic device 101 in operation 1218.

Figure 13A:
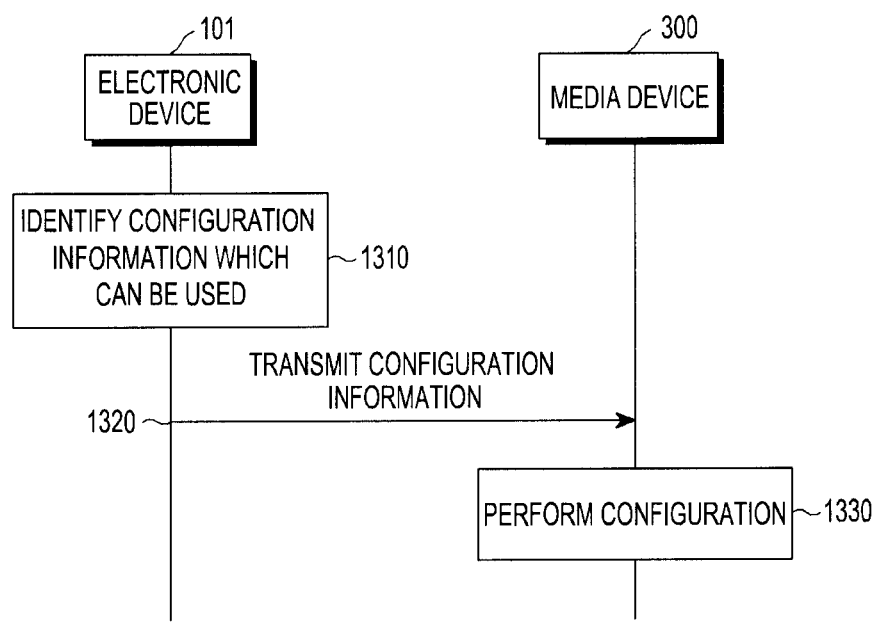
FIG. 13A and FIG. 13B are flowcharts illustrating a non-limiting operational example of a method of performing a configuration by the media device according to various embodiments of the present disclosure.
Figure 13B:
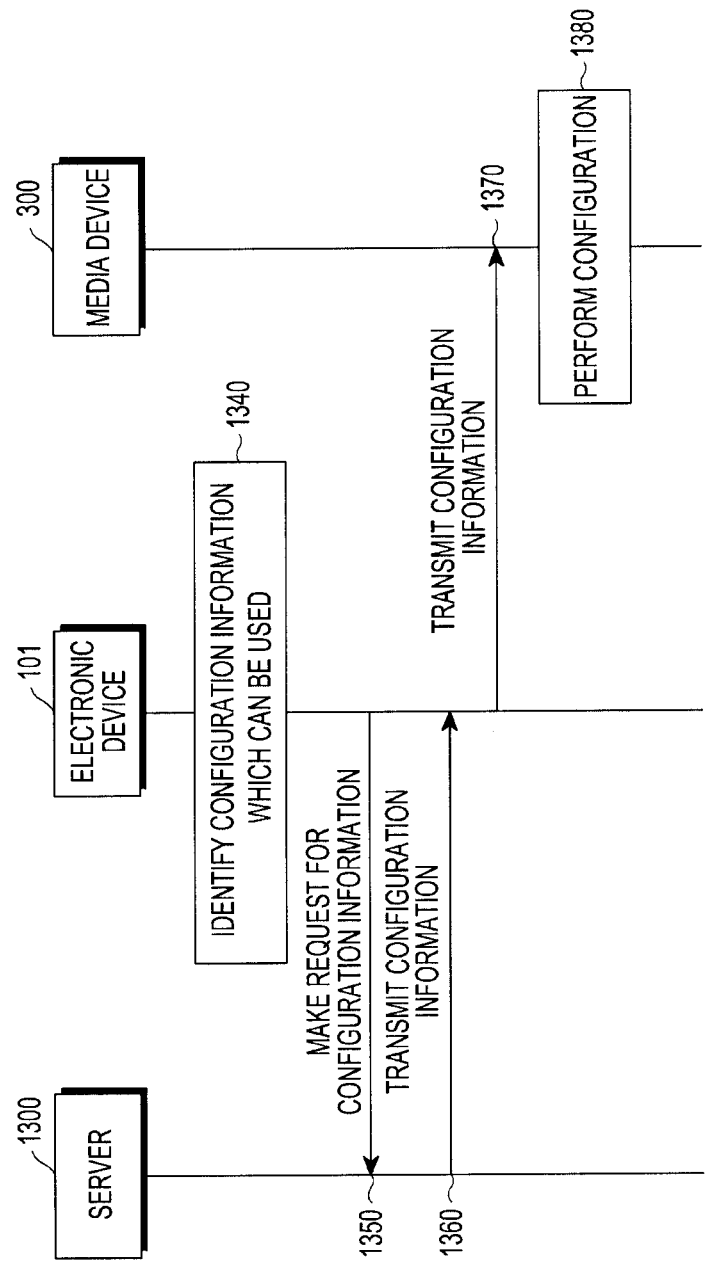

FIGS. 13A and 13B are flowcharts illustrating a method of performing a configuration by the media device according to various embodiments of the present disclosure.

FIG. 13A illustrates a method through which the media device 300 receives configuration information stored in the electronic device 101 and performs the configuration after the connection between the electronic device 101 and the media device 300 is formed.

In operation 1310, the electronic device 101 may identify configuration information which can be used by the media device 300. The configuration information may include at least one piece of language configuration information, audio configuration information, video configuration information, network configuration information, content region configuration information, and account information.

The electronic device 101 may identify configuration information which is used for the configuration of the media device 300 among at least one piece of the configuration information included in the memory 130 of the electronic device 101 based on the first information.

In operation 1320, the electronic device 101 may transmit the identified configuration information which is used for the configuration of the media device 300 to the media device 300.

In operation 1330, the media device 300 may perform the configuration by using the received configuration information. The media device 300 may identify the configuration information which is used for the configuration of the media device 300 among the received configuration information. Since the received configuration information may include information which cannot be used for the configuration of the media device 300, the processor 320 may identify whether the received configuration information can be used for the configuration of the media device 300.

The media device 300 may perform the configuration based on the identified configuration information. Accordingly, the configuration of the media device 300 may be automatically performed even though the user does not directly perform the configuration during the configuration process.

FIG. 13B illustrates a method through which the media device 300 receives configuration information which the electronic device 101 receives from an external server 1300 and performs the configuration after the connection between the electronic device 101 and the media device 300 is formed.

In operation 1340, the electronic device 101 may identify configuration information which is used by the media device 300. The configuration information may include at least one piece of language configuration information, audio configuration information, video configuration information, network configuration information, content region configuration information, and account information.

The electronic device 101 may identify configuration information which is used for the configuration of the media device 300 among at least one piece of the configuration information included in the memory 130 of the electronic device 101 based on the first information.

When the electronic device 101 cannot identify configuration information is used for the configuration of the media device 300 in the memory 130, the electronic device 101 may make a request for the configuration information which is used for the configuration of the media device 300 to the external server 1300 in operation 1350. In operation 1360, the server 1300 may identify the configuration information which is for the configuration of the media device 300 among one or more information items stored in the server and transmits the configuration information to the electronic device 101 in response to the request.

In operation 1370, the electronic device 101 may transmit the configuration information, which is used for the configuration of the media device 300, acquired from the server 1300 to the media device 300.

In operation 1380, the media device 300 may perform the configuration by using the received configuration information. The media device 300 may identify the configuration information which is used for the configuration of the media device 300 among the received configuration information. Since the received configuration information may include information which cannot be used for the configuration of the media device 300, the processor 320 may identify whether the received configuration information can be used for the configuration of the media device 300.

The media device 300 may perform the configuration based on the identified configuration information. Accordingly, the configuration of the media device 300 may be automatically performed even though the user does not directly perform the configuration during the configuration process.

Figure 14:
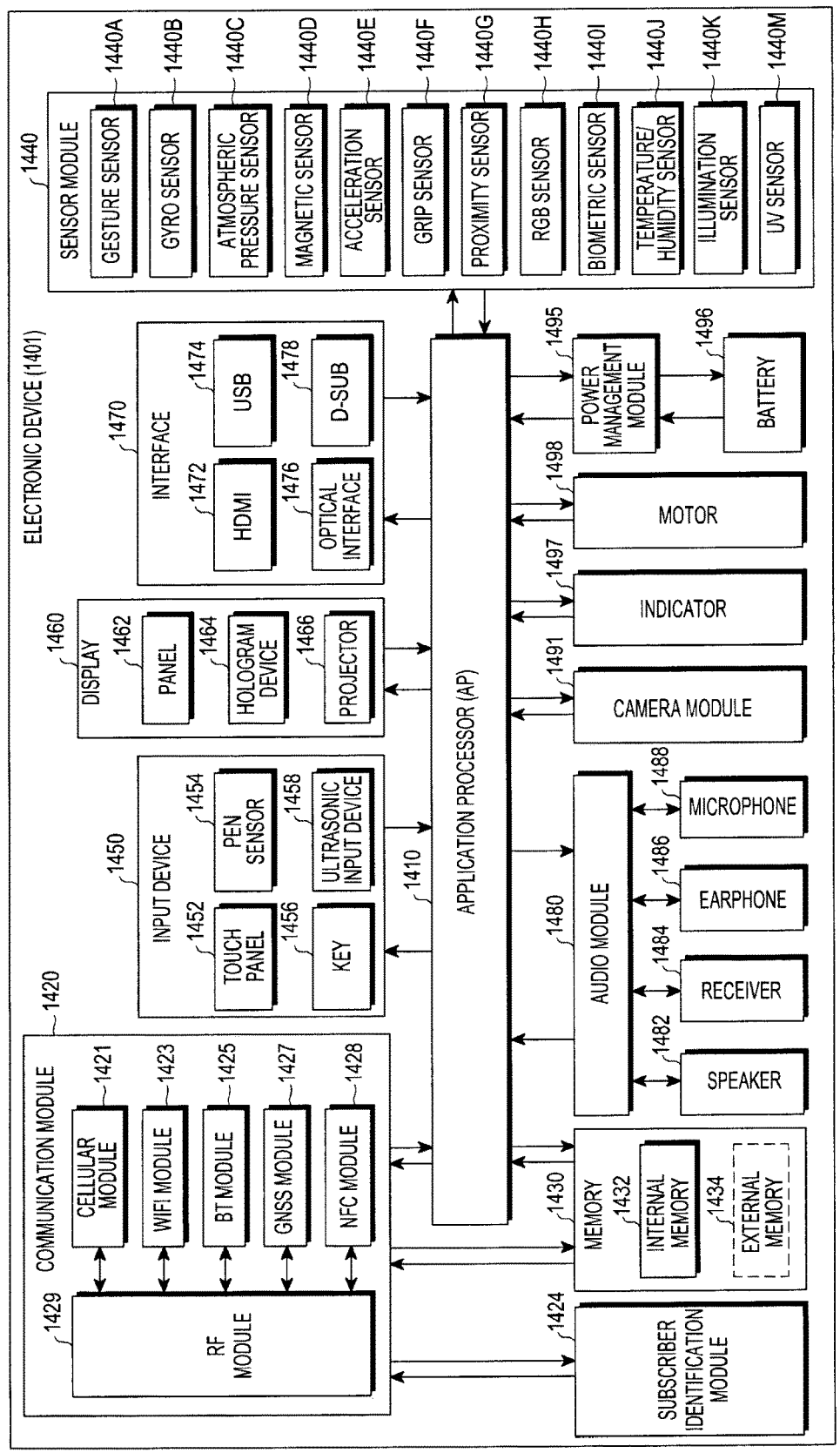
FIG. 14 is a block diagram illustrating the electronic device according to various embodiments of the present disclosure.

FIG. 14 is a block diagram of an electronic device 1401 according to various embodiments. The electronic device 1401 may include, for example, the whole or part of the electronic device 101 illustrated in FIG. 1. The electronic device 1401 may include at least one Application Processor (AP) 1410, a communication module 1420, a subscriber identification module 1424, a memory 1430, a sensor module 1440, an input device 1450, a display 1460, an interface 1470, an audio module 1480, a camera module 1491, a power management module 1495, a battery 1496, an indicator 1497, and a motor 1498.

The processor 1410 may control a plurality of hardware or software components connected to the processor 1410 by driving an operating system or an application program and perform processing of various pieces of data and calculations. The processor 1410 may be implemented by, for example, a System on Chip (SoC). According to an embodiment, the processor 1410 may further include a Graphic Processing Unit (GPU) and/or an image signal processor. The processor 1410 may include at least some (for example, a cellular module 1421) of the elements illustrated in FIG. 14. The processor 1410 may load, into a volatile memory, instructions or data received from at least one (for example, a non-volatile memory) of the other elements and may process the loaded instructions or data, and may store various data in a non-volatile memory.

The communication module 1420 may have a configuration equal or similar to that of the communication interface of FIG. 1 that includes hardware. The communication module 1420 may include, for example, the cellular module 1421, a Wi-Fi module 1423, a Bluetooth (BT) module 1425, a GNSS module 1427 (for example, a GPS module, a Glonass module, a Beidou module, or a Galileo module), an NFC module 1428, and a Radio Frequency (RF) module 1429.

The cellular module 1421 may provide a voice call, an image call, a text message service, or an Internet service through, for example, a communication network. According to an embodiment, the cellular module 1421 may identify and authenticate the electronic device 1401 within a communication network using a subscriber identification module (for example, the SIM card 1424). According to an embodiment, the cellular module 1421 may perform at least some of the functions that the processor 1410 may provide. According to an embodiment, the cellular module 1421 may include a Communication Processor (CP).

The Wi-Fi module 1423, the Bluetooth module 1425, the GNSS module 1427, or the NFC module 1428 may include, for example, a processor that processes data transmitted and received through the corresponding module. According to some embodiments, at least some (two or more) of the cellular module 1421, the Wi-Fi module 1423, the Bluetooth module 1425, the GNSS module 1427, and the NFC module 1428 may be included in one Integrated Chip (IC) or IC package.

The RF module 1429 may transmit/receive, for example, a communication signal (for example, an RF signal). The RF module 1429 may include, for example, a transceiver, a Power Amp Module (PAM), a frequency filter, a Low Noise Amplifier (LNA), or an antenna. According to another embodiment of the present disclosure, at least one of the cellular module 1421, the Wi-Fi module 1423, the Bluetooth module 1425, the GNSS module 1427, and the NFC module 1428 may transmit and receive RF signals through a separate RF module.

The subscriber identification module 1424 may include, for example, a card including a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 1430 (for example, the memory 130) may include, for example, an internal memory 1432 or an external memory 1434. The internal memory 1432 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disk drive, a Solid State Drive (SSD), and the like).

The external memory 1434 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 1434 may be functionally and/or physically connected to the electronic device 1401 through various interfaces.

The sensor module 1440 may measure a physical quantity or detect an operation state of the electronic device 1401, and may convert the measured or detected information into an electrical signal. The sensor module 1440 may include, for example, at least one of a gesture sensor 1,440A, a gyro sensor 1440B, an atmospheric pressure sensor 1440C, a magnetic sensor 1440D, an acceleration sensor 1440E, a grip sensor 1440F, a proximity sensor 1440G a color sensor 1440H (for example, a red, green, blue (RGB) sensor), a biometric sensor 1440I, a temperature/humidity sensor 1440J, a light sensor 1440K, and a ultraviolet (UV) sensor 1440M. Additionally or alternatively, the sensor module 1440 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 1440 may further include a control circuit for controlling one or more sensors included therein. In some embodiments, the electronic device 1401 may further include a processor configured to control the sensor module 1440 as a part of or separately from the processor 1410, and may control the sensor module 1440 while the processor 1410 is in a sleep state.

The input device 1450 may include, for example, a touch panel 1452, a (digital) pen sensor 1454, a key 1456, and an ultrasonic input unit 1458. The touch panel 1452 may use at least one of, for example, a capacitive type, a resistive type, an infrared type, and an ultrasonic type. Also, the touch panel 1452 may further include a control circuit. The touch panel 1452 may further include a tactile layer and provide a tactile reaction to the user.

The (digital) pen sensor 1454 may include, for example, a recognition sheet which is a part of the touch panel or is separated from the touch panel. The key 1456 may include, for example, a physical button, an optical key or a keypad. The ultrasonic input device 1458 may detect an ultrasonic wave generated by an input tool through a microphone and identify data corresponding to the detected ultrasonic wave.

The display 1460 may include a panel 1462, a hologram device 1464 or a projector 1466. The panel 1462 may be implemented to be, for example, flexible, transparent, or wearable. The panel 1462 and the touch panel 1452 may be implemented as one module. The hologram 1464 may show a three dimensional image in the air by using an interference of light. The projector 1466 may display an image by projecting light onto a screen. The screen may be located, for example, inside or outside the electronic device 1401. According to an exemplary embodiment, the display 1460 may further include a control circuit for controlling the panel 1462, the hologram device 1464, or the projector 1466.

The interface 1470 may include, for example, a High-Definition Multimedia Interface (HDMI) 1472, a Universal Serial Bus (USB) 1474, an optical interface 1476, or a D-subminiature (D-sub) 1478. Additionally or alternatively, the interface 1470 may include, for example, a Mobile High-definition Link (MHL) interface, a Secure Digital (SD) card/Multi-Media Card (MMC) interface, or an Infrared Data Association (IrDA) standard interface.

The audio module 1480 may bilaterally convert, for example, a sound and an electrical signal. At least some elements of the audio module 1480 may be included in, for example, the input/output interface. The audio module 1480 may process sound information which is input or output through, for example, a speaker 1482, a receiver 1484, earphones 1486, the microphone 1488 or the like.

The camera module 1491 is a device which may photograph a still image and a dynamic image. According to an embodiment, the camera module 1491 may include one or more image sensors (for example, a front sensor or a back sensor), a lens, an Image Signal Processor (ISP) or a flash (for example, LED or xenon lamp).

The power management module 1495 may manage, for example, power of the electronic device 1401. According to an embodiment, the power management module 1495 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (for example, a coil loop, a resonance circuit, a rectifier, etc.) for wireless charging may be further included. The battery gauge may measure, for example, a residual quantity of the battery 1496, and a voltage, a current, or a temperature during the charging. The battery 1496 may include, for example, a rechargeable battery or a solar battery.

The indicator 1497 may display a particular state (for example, a booting state, a message state, a charging state, or the like) of the electronic device 1401 or a part (for example, the processor 1410) of the electronic device 1401. The motor 1498 may convert an electrical signal into mechanical vibration, and may generate vibration, a haptic effect, or the like. Although not illustrated, the electronic device 1401 may include a processing unit (for example, a GPU) for supporting a mobile television (TV). The processing unit for supporting mobile TV may, for example, process media data according to a certain standard such as Digital Multimedia Broadcasting (DMB), Digital Video Broadcasting (DVB), or mediaFlom™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc., that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry that is configured for operation. The control unit may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc.

Under the broadest reasonable interpretation, the appended claims constitute statutory subject matter in compliance with 35 U.S.C. § 101 and none of the elements are software per se. No claim element herein is to be construed under the provisions of U.S.C. 112, sixth paragraph, unless the element is expressly recited using the phrase "means for".

The definition of the terms "unit" or "module" as referred to herein are to be understood as constituting hardware circuitry such as a CCD, CMOS, SoC, AISC, FPGA, at least one processor or microprocessor (a controller or control unit) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. § 101 and do not constitute software per se.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments, a storage medium having instructions stored therein is provided. The instructions are configured to allow one or more processors to perform one or more operations when the instructions are executed by the one or more processors. The one or more operations may include an operation of receiving a first signal including first information of the media device through first communication mode, an operation of generating a second signal including identification information of the media device by using at least a part of the first information in response to the first signal, an operation of transmitting the second signal to the media device through the first communication mode, and an operation of performing a connection with the media device by using the first information.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

What is claimed is:

1. An electronic device for performing a connection with a media device, the electronic device comprising:
    a communication module that receives from the media device through a first communication mode a first signal including a first information of the media device; and
    a processor that generates a second signal including identification information of the media device by using one or more information items of the first information in response to receiving the first signal, controls a communication module to transmit the second signal to the media device through the first communication mode, and establishes an operation connection with the media device by using the first information through the communication module.

2. The electronic device of claim 1, further comprising a sensor that receives a third signal through a second communication mode including second information of the media device that is different from the first information.

3. The electronic device of claim 2, wherein each portion of the first information and the second information includes one or more information items regarding a configuration state of the media device, information regarding an operation state of the media device, device information of the media device, and connection information of the media device.

4. The electronic device of claim 2, wherein, in response to determining that the media device has not been configured based on the first information, the processor controls activation of a sensor.

5. The electronic device of claim 2, wherein the processor compares one or more information items included in each portion of the first information and the second information and identifies whether the first signal and the third signal are received from the identical media device based on a result of the comparison.

6. The electronic device of claim 5, wherein, in response to identifying that the first signal and the third signal are received from the identical media device, the processor generates the identification information by using one or more information items of each portion of the first information and the second information and generates the second signal including the generated identification information.

7. The electronic device of claim 5, wherein, in response to identifying that the first signal and the third signal are received from the identical media device, the processor generates the identification information by using a random number for changing the one or more items of each portion of the first information and generates the second signal including the generated identification information.

8. The electronic device of claim 5, wherein, in response to identifying that the first signal and the third signal are received from the identical media device, the processor generates the identification information by using a hash value generated using one or more items of each portion of the first information and generates the second signal including the generated identification information.

9. The electronic device of claim 5, wherein, in response to identifying that the first signal and the third signal are received from the identical media device, the processor generates the identification information by using a random number included in the first information and generated by the media device and generates the second signal including the generated identification information.

10. The electronic device of claim 1, wherein the processor establishes the operation connection with the media device through the communication module based on a third communication mode by using operative connection information of the third communication mode included in the first information.

11. The electronic device of claim 1, wherein, in response to the operation connection being established, the processor identifies configuration information for the configuration of the media device and controls transmission of the configuration information to the media device through the operation connection.

12. A method of establishing a connection with a media device by an electronic device, the method comprising:
    receiving through a first communication mode, a first signal including a first information of the media device;
    generating in response to the first signal, a second signal including identification information of the media device by using at least a portion of the first information;
    transmitting through the first communication mode, the second signal to the media device; and
    establishing an operation connection with the media device by using the first information.

13. An electronic device for establishing a connection with a mobile device, the electronic device comprising:
    a communication module that transmits through a first communication mode a first signal including a first information of the electronic device and receives a second signal including identification information generated using one or more items of the first information from a mobile device having received the first signal; and
    a processor that establishes an operation connection with the mobile device in response to receiving the second signal and determining that the identification information is valid through the communication module.

14. The electronic device of claim 13, further comprising an output module that outputs a third signal including second information of the electronic device that is different from the first information through second communication mode.

15. The electronic device of claim 14, wherein one or more information items of the first information and the second information includes one portion of information regarding a configuration state of the electronic device, information regarding an operation state of the electronic device, device information of the electronic device, and connection information of the electronic device.

16. The electronic device of claim 14, wherein the identification information is generated when the mobile device identifies that the electronic device transmitting the first signal and the mobile device transmitting the third signal are the identical electronic device.

17. The electronic device of claim 13, wherein the processor generates a random number for changing one or more information items of the first information, changes one portion of the first information by using the random number, and inserts the random number into the first information.

18. The electronic device of claim 13, wherein, when the second signal is received, the processor controls display of a popup window or a message indicating that a configuration of the electronic device is performed through the mobile device.

19. The electronic device of claim 13, wherein the processor establishes the operation connection with the mobile device through a third communication mode and connection information of the third communication mode is included in the first information.

20. The electronic device of claim 13, wherein, after the operation connection is established, the communication module receives configuration information from the mobile device, and the processor performs the configuration based on the configuration information.

* * * * *